United States Patent
Lund et al.

[19]

[11] Patent Number: 5,971,469
[45] Date of Patent: Oct. 26, 1999

[54] PICKUP TRUCK CAB EXTENDING TONNEAU COVER

[75] Inventors: David M. Lund, Andover; Joel E. Johnson, Coon Rapids, both of Minn.

[73] Assignee: Lund Industries, Incorporated, Anoka, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,362

[22] Filed: Nov. 1, 1996

[51] Int. Cl.$^6$ ..................................... B60P 7/02
[52] U.S. Cl. ................. 296/100.01; 296/100.06
[58] Field of Search .............. 296/10, 26, 99.1, 296/100, 210, 100.01, 100.02, 100.03, 100.04, 100.05, 39.1, 39.2, 100.06, 100.07

[56] References Cited

U.S. PATENT DOCUMENTS

| | | |
|---|---|---|
| D. 235,327 | 6/1975 | Morris . |
| D. 248,386 | 7/1978 | Hefner ................................. 296/39.2 |
| D. 281,487 | 11/1985 | Chapman . |
| D. 294,242 | 2/1988 | O'Neill . |
| D. 323,479 | 1/1992 | Akashi et al. . |
| D. 324,195 | 2/1992 | Ueno . |
| D. 332,072 | 12/1992 | Shirlin et al. . |
| D. 333,289 | 2/1993 | Shirlin et al. . |
| D. 333,607 | 3/1993 | Isler . |
| D. 337,554 | 7/1993 | Lucas . |
| D. 350,107 | 8/1994 | Ramaciotti . |
| D. 373,985 | 9/1996 | Weaver et al. . |
| 3,936,077 | 2/1976 | Bliek . |
| 3,954,296 | 5/1976 | Patnode . |
| 4,061,394 | 12/1977 | Vodin . |
| 4,273,377 | 6/1981 | Alexander . |
| 4,285,539 | 8/1981 | Cole . |
| 4,377,307 | 3/1983 | Santarelli . |
| 4,479,677 | 10/1984 | Gulette et al. . |
| 4,573,730 | 3/1986 | Gondert et al. . |
| 4,600,233 | 7/1986 | Boydston . |
| 4,687,247 | 8/1987 | Muscat . |
| 4,688,845 | 8/1987 | Kingsley ................................. 296/99.1 |
| 4,776,629 | 10/1988 | Cross ................................. 296/100.03 |
| 4,792,178 | 12/1988 | Kokx . |
| 4,799,729 | 1/1989 | Muscat . |
| 4,813,735 | 3/1989 | Avitable ............................. 296/100.02 |
| 4,861,092 | 8/1989 | Bogard . |
| 5,067,768 | 11/1991 | Fischbach . |
| 5,127,701 | 7/1992 | Miller ..................................... 296/100 |
| 5,139,375 | 8/1992 | Franchuk . |
| 5,183,309 | 2/1993 | Jordan . |
| 5,207,262 | 5/1993 | Rushford . |
| 5,228,736 | 7/1993 | Dutton . |
| 5,275,458 | 1/1994 | Barben et al. . |
| 5,301,995 | 4/1994 | Isler . |
| 5,328,310 | 7/1994 | Lockney . |
| 5,335,960 | 8/1994 | Benignu, Jr. . |
| 5,385,377 | 1/1995 | Girard . |
| 5,398,985 | 3/1995 | Robinson . |
| 5,593,201 | 1/1997 | Bateman ................................. 296/24.1 |
| 5,685,593 | 11/1997 | O'Conner ................................. 296/100 |

OTHER PUBLICATIONS

Brochure: "World's Finest Camper Tops®", Tri–Glas VMC Fiberglass, Inc., Daleville, Alabama no date.

*Primary Examiner*—Stephen Avila
*Attorney, Agent, or Firm*—Merchant & Gould P.C.

[57] ABSTRACT

A cab extending tonneau cover for attachment to a pickup truck cargo area sidewalls and extending rearwardly of a pickup truck cab, the cover comprising a frame including a cab extension and first and second arms, the cab extension being constructed and arranged to extend a pickup truck cab rearwardly, the first and second arms being constructed and arranged to attach to left and right pickup truck sidewalls, a deck provided between the first and second arms of said frame, said deck including a hinge system for rotating said deck between open and closed portions, wherein said deck is readily removable from said frame.

24 Claims, 6 Drawing Sheets

PICKUP TRUCK CAB EXTENDING TONNEAU COVER

FIELD OF THE INVENTION

The present invention relates to a pickup truck cab extending tonneau cover, and more particularly to a pickup truck cab extending tonneau cover including a relatively rigid deck which can be conveniently lifted and removed to expose the cargo area of the pickup truck.

BACKGROUND OF THE INVENTION

Owners of pickup truck style motor vehicles often desire to provide a cover over the bed or cargo area of their pickup truck in order to conceal the cargo from view or protect it from weather. Accordingly, many different designs of tonneau covers and toppers are presently available. Many of the prior tonneau covers and toppers provide desired aesthetics when attached to a pickup truck. A drawback, however, is that they often do not look like a natural extension of the vehicle. Furthermore, they can be difficult to remove when it is necessary to load a large item in the cargo area. Another popular accessory for pickup trucks is a cab extension, sometimes called a cab fairing. This accessory generally provides the pickup truck with the appearance that the cab extends farther rearwardly than it actually does.

Devices have been designed which incorporate some of the features of tonneau covers and cab extensions. For example, see U.S. Pat. Nos. 3,954,296 to Patnode; 4,061,394 to Vodin; Des. U.S. Pat. No. 281,487 to Chapman; Des. U.S. Pat. No. 324,195 to Ueno; and Des. U.S. Pat. No. 323,479 to Akashi et al.

SUMMARY OF THE INVENTION

A cab extending tonneau cover for attachment to a pickup truck is provided by the present invention. The cab extending tonneau cover includes a cab extension and first and second arms. The cab extension being constructed and arranged to extend rearwardly of a pickup truck cab. The first and second arms being constructed and arranged to attach to the left and rights pickup sidewalls. A deck is provided between the first and second arms of the frame and can be rotated to provide access to a pickup truck cargo area. Advantageously, the deck can easily be removed from the frame. By easily removed, it is meant that one person can lift the deck away from the frame.

A pickup truck is provided by the present invention which includes a cab, a cargo area, and a cab extending tonneau cover attached thereo.

DETAILED DESCRIPTION OF THE PREFERRED EMBODIMENT

The preferred embodiments of the invention are now described in detail with reference to the drawings, wherein like reference numerals represent like parts and assemblies throughout the several views. Reference to the preferred embodiments does not limit the scope of the invention which is limited only by the scope of the claims attached hereto.

Figure 1:
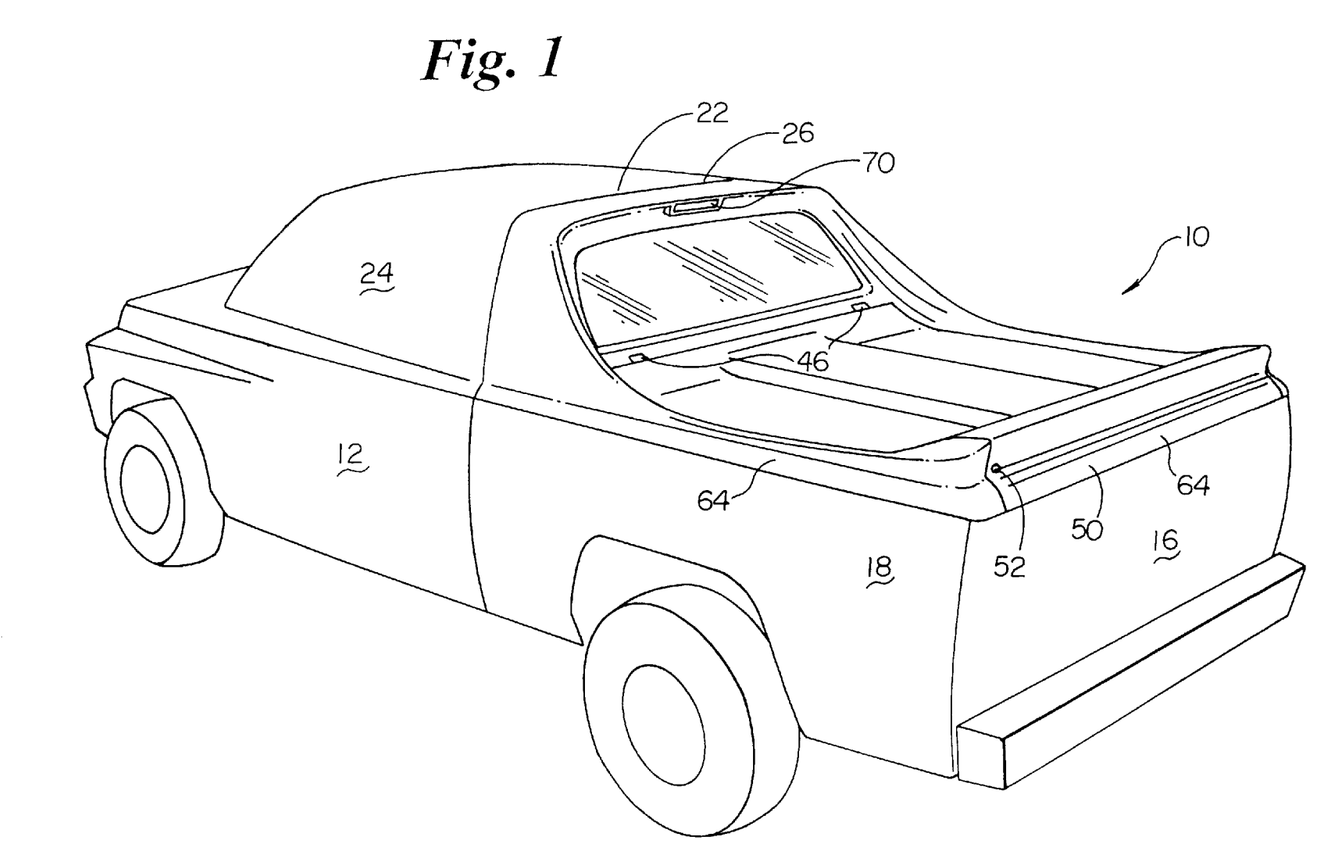
FIG. 1 is a perspective view of a preferred embodiment of the pickup truck cab extending tonneau cover according to the principles of the present invention shown mounted on a pickup truck.
Figure 2:
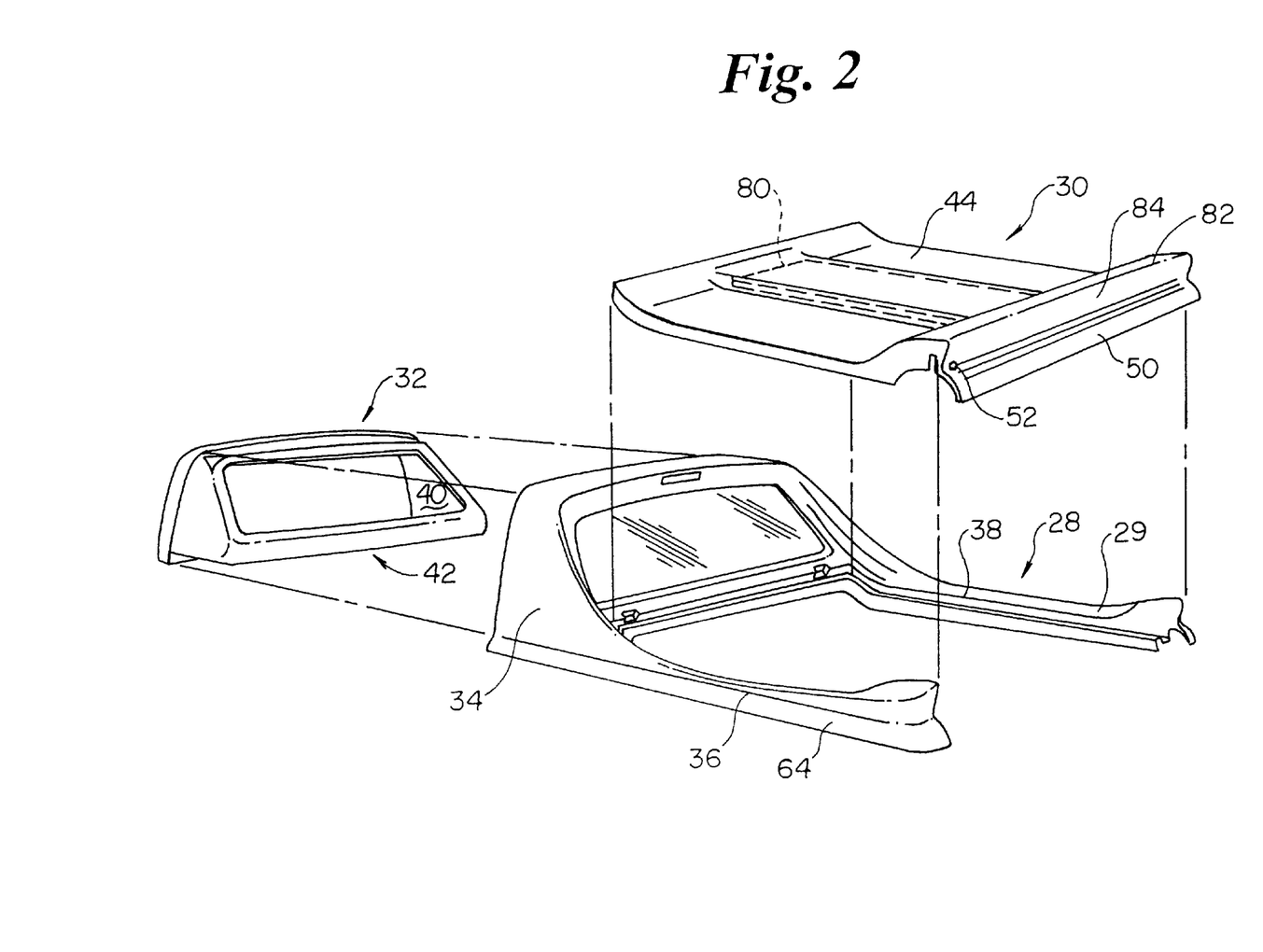
FIG. 2 is an exploded view of the cab extending tonneau cover of FIG. 1 showing how the various regions thereof interrelate.
Figure 3:
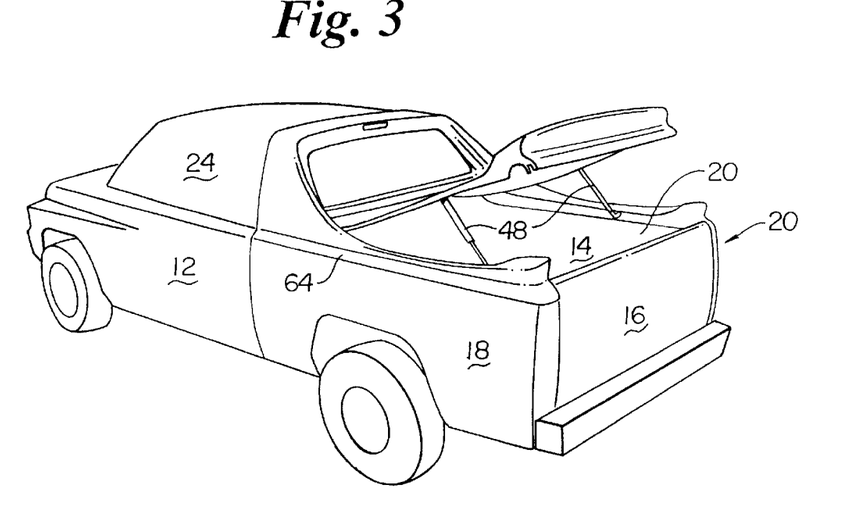
FIG. 3 is a perspective view of the cab extending tonneau cover of FIG. 1 where the deck is in the open position.

Referring to FIGS. 1–3, a pickup truck cab extending tonneau cover in accordance with the present invention is depicted at 10 and is mounted to a pickup truck 12. It should be understood that the pickup truck cab extending tonneau cover 10 may be referred to herein as the cab extending tonneau cover or more simply as the cover. The cab extending tonneau cover 10 is shown mounted over the bed or cargo area 14 of the pickup truck 12. As shown, the cab extending tonneau cover 10 is attached to the pickup truck left sidewall 18 and right sidewall 20, and extends over the tailgate 16. Thus, the cab extending tonneau cover 10 is shown, in FIG. 1, completely concealing the pickup truck bed or cargo area 14.

For purposes of the description herein, the terms "left," "right," "rear," and "forward" refer to the orientation provided in FIG. 1. Alternatively stated, the orientation is provided to reflect that perceived by a driver of the pickup truck seated in the driver's seat. Thus, the left sidewall 18 and the right sidewall 20 are provided on the left rear and right rear sides, respectively, of the pickup truck 12. Furthermore, the pickup truck 12 includes a cab 24 having a rear edge 22 against which the forward edge 26 of the cab extending tonneau cover abuts.

The cab extending tonneau cover 10 includes three general parts or regions which interact with each other. These general parts or regions include a shell or body region 28; a hatch or cargo area access region 30; and a liner or interior region 32. The three regions fit together to form the cab extending tonneau cover 10 of the present invention. The shell or body region 28 provides the overall framework or structure of the cab extending tonneau cover 10 and includes a frame 29 which in turn includes a cab extension 34 and left mounting rail 36 and right mounting rail 38. It is these rails which attach to the pickup truck 12. The liner or interior region 32 fits within the cab extension 34 to provide a finished interior surface 40 and a shelf 42. The hatch or cargo area access region 30 includes a deck 44 and hinges 46 about which the deck can rotate upwards in order to expose the pickup truck bed or cargo area 14. As shown in FIG. 2, gas cylinders 48 can be provided to help lift and hold the deck 44 in an open position. FIG. 2 shows the deck 44 in an open position, thereby exposing the pickup truck bed or cargo area 14. FIG. 1 shows the deck 44 in a closed position with the tailgate flange 50 extending over the top surface of the tailgate 16.

It should be readily apparent to one skilled in the art that an advantage of the present invention is the ability to lock or secure the pickup truck bed or cargo area 14 by the present invention. The lock 52 can be used to lock the deck 44 to the shell or body region 28. Furthermore, the tailgate flange 50 extends over the tailgate to a degree sufficient to prevent opening the tailgate when the cab extending tonneau cover 10 is closed. Because certain models of pickup trucks do not include a lock on the tailgate, the present invention provides an alternative way of locking the tailgate. If desired, the tailgate flange 50 can be reduced or removed to allow access to the pickup truck bed or cargo area 14 via the tailgate 16 while the cab extending tonneau cover 10 is in the closed position. This may be a desired feature when, for example, the tailgate is provided with a separate locking device.

Figure 4:
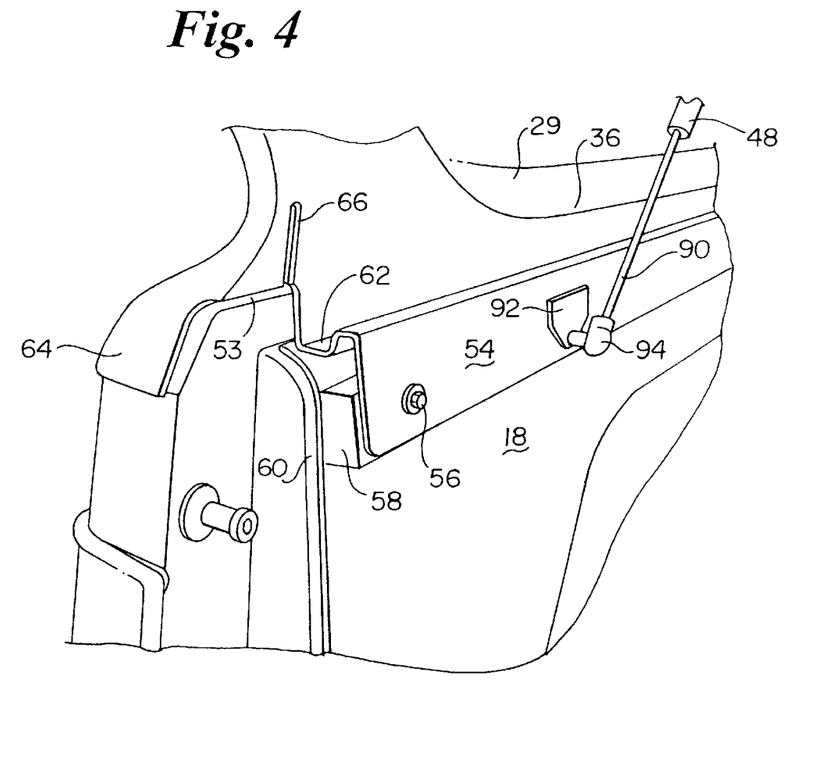
FIG. 4 is a perspective view showing the attachment of the cab extending tonneau cover of FIG. 1 to a pickup truck.
Figure 5:
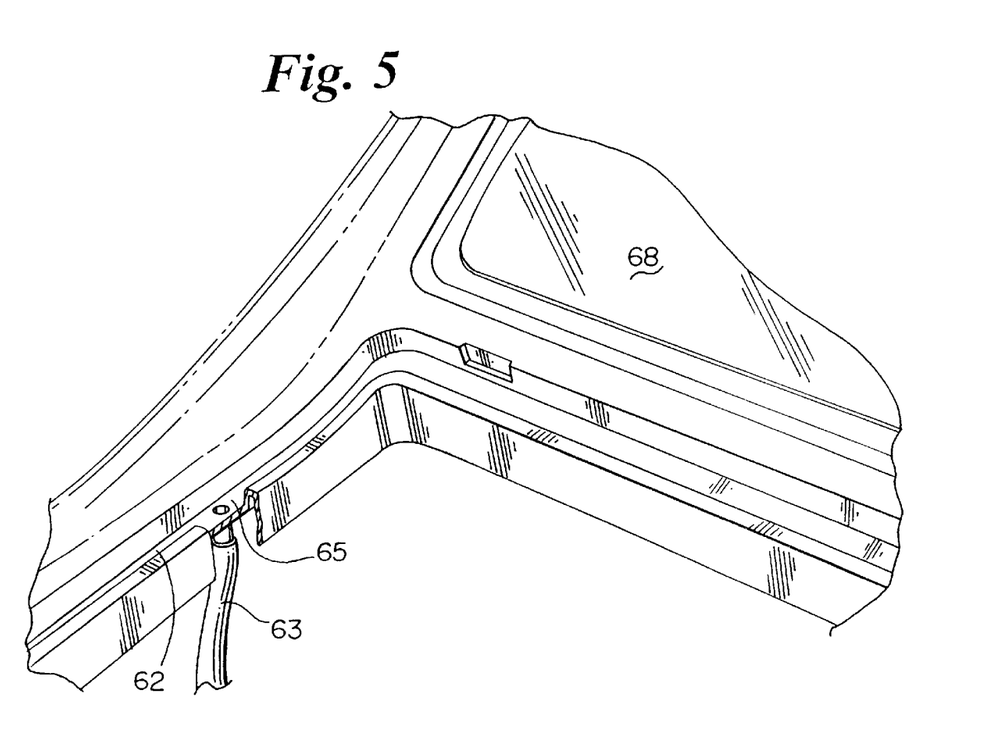
FIG. 5 is a view of the drainage system of the cab extending tonneau cover of FIG. 1.

Now referring to FIGS. 4 and 5, a more detailed description of the shell or body region 28 is provided. As discussed above, the shell or body region 28 includes a frame 29 which generally provides the structural integrity for the entire cab extending tonneau cover. Once the frame is attached to the pickup truck, it is generally desired to leave it in place. As will be discussed in more detail, the deck 44 can be conveniently removed from the cab extending tonneau cover 10 in order to open up the pickup truck bed or cargo area 14. Accordingly, the frame 29 can be considered a rather permanent accessory. In an alternative embodiment, the frame can be provided with a releasable connection to the pickup truck by, such as, a clamping system.

FIG. 4 shows how the left mounting rail 36 of the frame 29 attaches to the left sidewall 18 of the pickup truck 12. It should be appreciated that the attachment of the right mounting rail 38 to the right sidewall 20 is provided in a similar fashion to that described for the left mounting rail 36. The left mounting rail 36 rests on the top surface 52 of the left sidewall. The depending flange 54 extends downward as part of the left mounting rail 36 and provides an area for connection to the inside surface of the left sidewall 18. Bolts/nuts 56 pass through the depending flange 54, a spacing 58, and the interior depending wall 60 of the left sidewall 18. It is expected that about two to three bolts/nuts 56 per side should be sufficient to hold the cab extending tonneau cover 10 in place on the pickup truck 12. The spacer 58 is provided because the pickup truck bed or cargo area 14 is tapered. It should be appreciated that various models of pickup trucks provide varying degrees of taper. Accordingly, the thickness of the spacer 58 can be adjusted to accommodate various models of pickup truck. The rear end of the left mounting rail 36 is cut away so that the tailgate 16 of the pickup truck can close. The slot 66 is provided for locking the deck 44 to the frame 29. Thus, by turning the lock 52, an arm engages the slot 66 in order to lock the deck 44 and frame 29 together.

The frame 29 includes a rain gutter 62 which extends the interior length of the deck 44 and collects water runoff. As shown in FIG. 5, a tube 63 can be provided at a drain basin 65 in from the rain gutter 62, preferably near the forward end of the rain gutter, in order to provide a drain to the exterior of the pickup truck. In many pickup truck models, a hole is provided in the pickup truck cargo area through which rain water normally drains. The tube 63 can be adapted to run through that hole in order to convey water outside of the truck.

An important feature of the invention is the trim flange 64 which extends downward and is provided along the lower exterior edge of the cab extending tonneau cover 10. The trim flange 64 is important because it hides the seam between the cab extending tonneau cover 10 and the pickup truck 12. In most prior art toppers, the seam between the topper and the pickup truck is exposed, thereby detracting from its appearance. By providing the trim flange 64, a cleaner and more custom look can be provided. Furthermore, the trim flange 64 can be adjusted and/or modified to reflect or follow the trim characteristics of various pickup truck models.

Figure 7:
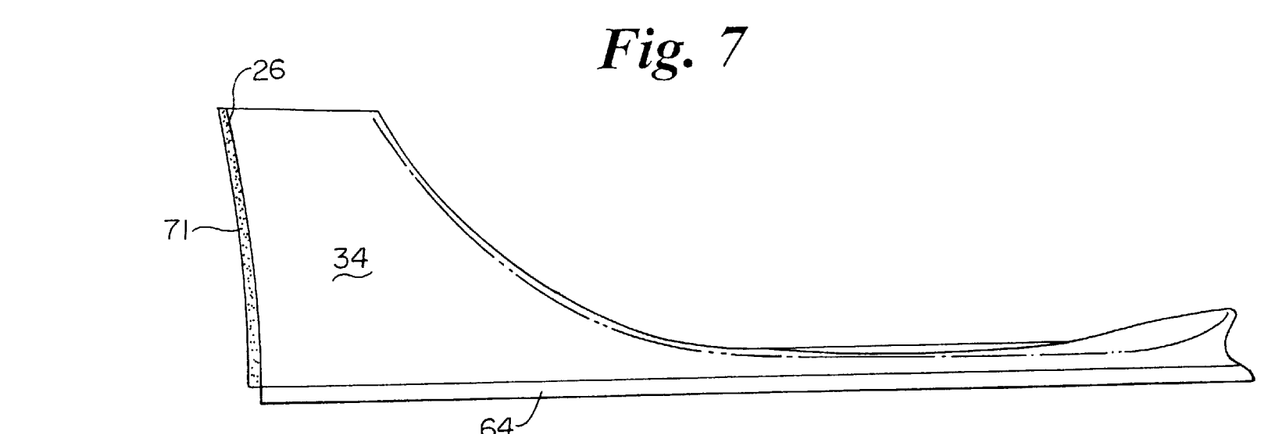
FIG. 7 is an elevation side view of the cab extending tonneau cover of FIG. 1.
Figure 8:
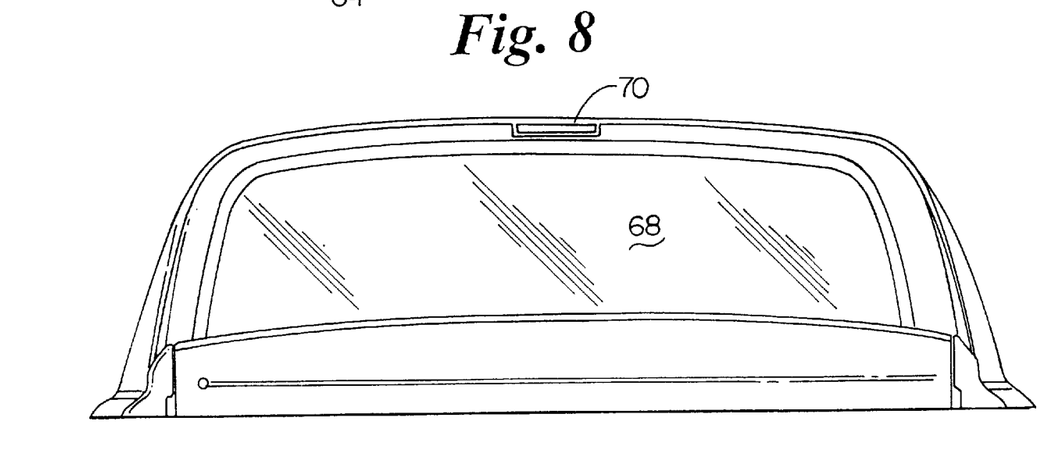
FIG. 8 is an elevation rear view of the cab extending tonneau cover of FIG. 1.

The forward portion of the frame includes the cab extension 34. When provided on a pickup truck 12, the cab extension 34 extends away from the rear edge 22 of the pickup truck cab 24. The cab extension 34 includes a rear window 68 and brake light 70. The window 68 is recessed into the cab extension 34 in order to provide a finished appearance and a more secure placement of the window. As shown in FIG. 7, the forward edge 26 of the cab extension 34 includes a gasket adhered thereto. Preferably, the gasket 71 is a closed cell foam which is compressed between the rearward edge 22 of the cab 24 and the forward edge 26 of the cab extension 34. It is the gasket 71 which provides a seal between the cab 24 and the cab extension 34 in order to keep out weather and prevent knocking and rattling. The gasket 71 additionally allows the cab and the cover 10 to move relative to each other. Thus, the gasket 71 is preferably provided along the entire circumference of the cab extension region 34 within the seam between the cab 24 and the cab extending touneau cover 10. By providing a sufficient seal, it should be appreciated that the pickup truck rear window can be removed thereby actually extending the cab into the cab extending tonneau cover. Furthermore, the window 68 can be made from any conventionally used motor vehicle window material, including, clear or smoked glass, plastic, etc., and can include heating elements in order to enhance visibility therethrough.

Figure 9:
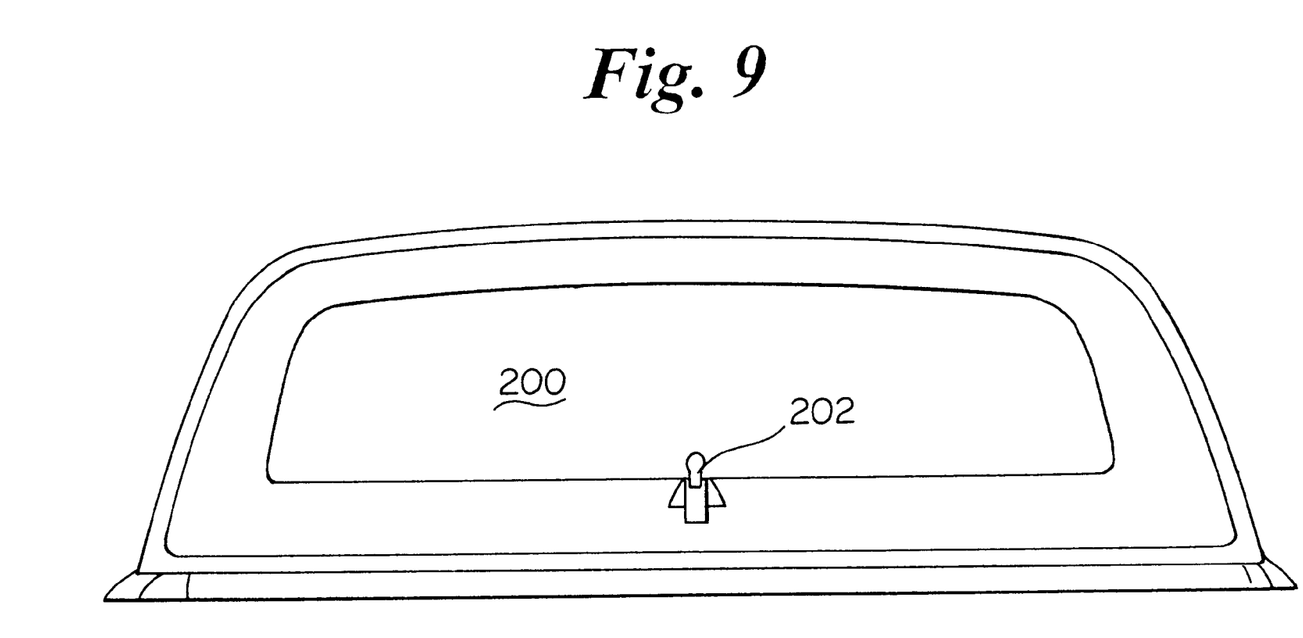
FIG. 9 is a forward view of an alternative embodiment of the cab extending tonneau cover according to the principles of the present invention.

An alternative embodiment of the invention is shown in FIG. 9 where the window 200 is hinged and includes an extension arm 202 which allows the window 200 to open. Alternative ways of opening the window can be provided.

The frame 29 is preferably manufactured from Fiberglas. In order to provide a finished surface within the cab extension 34, the liner or interior region 32 is provided. This region fits within the cab extension 34 and provides a finished interior surface 40 and a shelf 42. It should be understood that the shelf 42 can be omitted if it is desired to provide access from the cab to the pickup truck bed or cargo area 14. Furthermore, the liner or interior region 32 can be provided with a lower shelf if it is desired to provide a larger storage area which is separate from the pickup truck bed or cargo area 14 and which can be accessed from the pickup truck cab. The additional storage area can be used, for example, for storage of various accessories, placement of speakers, etc.

The hatch or cargo area access region 30 includes a deck 44 and hinges 46 which allow the deck to rotate upwards in order to expose the pickup truck bed or cargo area 14. As shown in FIG. 2, a structural reinforcement panel 80 can be provided and embedded within the deck 44 in order to provide desired rigidity. In a preferred embodiment, the reinforcement panel can be constructed of plywood. It should be understood that the deck 44 is fairly rigid which means that it does not fold and would be considered a hard surface. A preferable material for manufacturing the deck 44 is fiberglass because it is light. It should be appreciated, however, that the three regions of the invention can be manufactured from materials other than fiberglass, such as, plastics. However, fiberglass is a desired material because of its light weight and ease of handleability.

The deck 44 is provided with a rear spoiler 82 which provides a gripping surface 84 that allows one to push against it in order to open the bed or cargo area 14. In addition, the spoiler 82 enhances the overall appearance of the cab extending tonneau cover.

Figure 6:
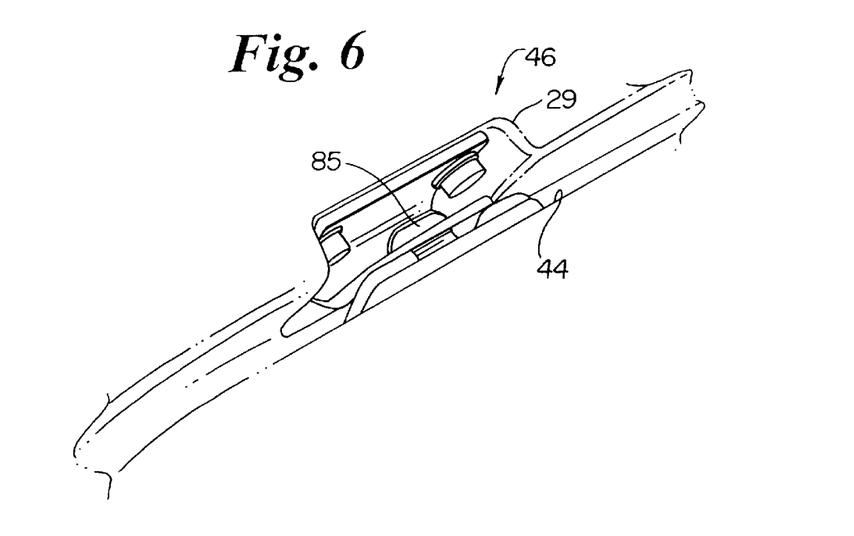
FIG. 6 is a view of the hinge connection between the deck and the frame of the cab extending tonneau cover of FIG. 1.

As shown in FIG. 6, the deck 44 is attached to the frame 29 at hinges 46. The hinge 46 is preferably a releasable type hinge which allows the deck to rotate to a certain position, then allows the deck to be removed completely from the frame. Once the deck 44 is rotated upward to a predetermined rotational degree, the tongue 85 can slide free of the hinge bar 87, and the deck 44 can be removed. Thus, the cab extending tonneau cover of the invention provides for convenient removal of the deck.

Again referring to FIG. 4, the gas cylinders 48 are provided to assist in opening the pickup truck bed or cargo area 14. An exemplary air cylinder which can be used according to the present invention is available from "Spring Lift Corporation of Monticello, Ariz." The air cylinder 48 includes an arm 90 which attaches to the depending flange 54 via bracket 92 and rotational socket 94. When removing the deck 44 from the frame 29, the air cylinder 48 can be removed by popping the socket 94 off. According to the invention, the deck 44 is "easily removable" which means that it can be quickly and easily removed by one person. The deck preferably weighs between about 30 and 80 pounds, and more preferably between about 50 and 75 pounds.

The above specification provides a complete description of the manufacture and use of the present invention. Since many embodiments of the invention can be made without departing from the spirit and scope of the invention, the invention resides in the claims hereinafter appended.

We claim:

1. A cab extending tonneau cover for attachment to a pickup truck cargo area side walls and extending rearwardly of a pickup truck cab, the cover comprising:
    (a) a shell comprising a cab extension, a left mounting rail constructed for attachment to a pickup truck bed left side wall, and a right mounting rail constructed for attachment to a pickup truck bed right side wall;
    (b) a liner attached to the shell within the cab extension to provide a finished interior surface within the cab extension, said liner including a shelf for providing an interior region within said cab extension; and
    (c) a deck hingedly attached to the shell to allow the deck to rotate between an open position and a closed position, the open position allowing access to a pickup truck bed when the left mounting rail and the right mounting rail are attached to a pickup truck bed side walls.

2. A cab extending tonneau cover according to claim 1, wherein said deck is constructed to fit between the left mounting rail and the right mounting rail when provided in a closed position.

3. A cab extending tonneau cover according to claim 1, wherein said liner provides a shelf.

4. A cab extending tonneau cover according to claim 1, wherein said deck is hingedly attached to said shell via a releasable connection.

5. A cab extending tonneau cover according to claim 1, further comprising at least two gas cylinders attached to said deck and said shell for holding the deck in an open position.

6. A cab extending tonneau cover according to claim 1, further comprising a lock for securing the deck to the shell in a closed position.

7. A cab extending tonneau cover according to claim 1, wherein said deck further comprises a tailgate flange constructed for extending over a pickup truck tailgate when the deck is in a closed position.

8. A cab extending tonneau cover according to claim 1, further comprising a rain gutter for collecting water runoff from said deck and funneling water runoff to a drain basin.

9. A cab extending tonneau cover according to claim 8, wherein said drain basin includes a tube.

10. A cab extending tonneau cover according to claim 1, wherein said shell further comprises trim flange extending downwardly along the left mounting rail and the right mounting rail.

11. A cab extending tonneau cover according to claim 1, wherein said cab extension includes a gasket for providing a seal between said cab extension and a pickup truck cab.

12. A cab extending tonneau cover according to claim 11, wherein the gasket comprises a closed cell foam.

13. A cab extending tonneau cover according to claim 1, wherein said shell further comprises a brake light.

14. A cab extending tonneau cover according to claim 1, wherein said shell further comprises a window.

15. A cab extending tonneau cover according to claim 14, wherein the window is attached to the shell by a hinge.

16. A cab extending tonneau cover according to claim 3, wherein said deck further comprises a spoiler.

17. A pickup truck comprising:
    a cab including a rearward edge;
    a cargo area comprising a left side wall, a right side wall, and a tailgate; and
    a cab extending tonneau cover attached to the left side wall and the right side wall and provided extending rearwardly of the cab, the cover comprising:
        a shell comprising a cab extension, a left mounting rail attached to the left side wall, and a right mounting rail attached to the right side wall;
        a liner attached to the shell within the cab extension to provide a finished interior surface within the cab extension, said liner including a shelf for providing an interior region within said cab extension; and
        a deck hingedly attached to the shell to allow the deck to rotate between an open position and a closed position, the open position allowing access to a pickup truck bed when the left mounting rail and the right mounting rail are attached to a pickup truck bed side walls.

18. A pickup truck according to claim 17, wherein said deck is constructed to fit between the left mounting rail and the right mounting rail when provided in a closed position.

19. A pickup truck according to claim 17, wherein the shelf of said liner separates the interior region within said cab extension from said cargo area.

20. A pickup truck according to claim 17, wherein the left mounting rail extends to the tailgate, and the right mounting rail extends to the tailgate.

21. A cab extending tonneau cover according to claim 17, wherein said deck is hingedly attached to said shell via a releasable connection.

22. A cab extending tonneau cover according to claim 17, further comprising at least two gas cylinders attached to said deck and said shell for holding the deck in an open position.

23. A cab extending tonneau cover according to claim 17, further comprising a lock for securing the deck to the shell in a closed position.

24. A cab extending tonneau cover according to claim 17, wherein said deck further comprises a tailgate flange which extends over the tailgate when the deck is in a closed position.

* * * * *

UNITED STATES PATENT AND TRADEMARK OFFICE
CERTIFICATE OF CORRECTION

PATENT NO. : 5,971,469　　　　　　　　　　　　　　　　　　　　Page 1 of 1
DATED : October 26, 1999
INVENTOR(S) : Lund et al.

It is certified that error appears in the above-identified patent and that said Letters Patent is hereby corrected as shown below:

Column 3,
Line 29, "52" should read -- 53 --.

Signed and Sealed this

Fifth Day of February, 2002

Attest:

JAMES E. ROGAN
*Attesting Officer*　　　*Director of the United States Patent and Trademark Office*